(12) United States Patent
Zhou et al.

(10) Patent No.: US 11,778,713 B2
(45) Date of Patent: Oct. 3, 2023

(54) STREET LAMP INTELLIGENT MEASUREMENT AND CONTROL DEVICE BASED ON NB-IOT TECHNOLOGY

(71) Applicants: OPPLE LIGHTING CO., LTD., Shanghai (CN); SUZHOU OPPLE LIGHTING CO., LTD., Suzhou (CN)

(72) Inventors: Zhenhua Zhou, Shanghai (CN); Zhendong Song, Shanghai (CN); Hongbo Wang, Shanghai (CN); Fuyou Yang, Shanghai (CN); Tao Wang, Shanghai (CN); Jun Zhang, Shanghai (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 48 days.

(21) Appl. No.: 17/514,959

(22) Filed: Oct. 29, 2021

(65) Prior Publication Data
US 2022/0053625 A1 Feb. 17, 2022

Related U.S. Application Data

(63) Continuation of application No. PCT/CN2020/088249, filed on Apr. 30, 2020.

(30) Foreign Application Priority Data

May 8, 2019 (CN) .......................... 201910380866.2
May 8, 2019 (CN) .......................... 201920652961.9

(51) Int. Cl.
*H05B 47/14* (2020.01)
*H05B 47/16* (2020.01)
(Continued)

(52) U.S. Cl.
CPC .............. *H05B 47/14* (2020.01); *F21S 8/085* (2013.01); *H05B 47/16* (2020.01); *F21W 2131/103* (2013.01)

(58) Field of Classification Search
None
See application file for complete search history.

(56) References Cited

U.S. PATENT DOCUMENTS

2014/0110832 A1\* 4/2014 Crisp ..................... H05K 1/111
257/696
2017/0273165 A1\* 9/2017 Sung ...................... G06Q 50/26

FOREIGN PATENT DOCUMENTS

CN 108307571 A \* 2/2006 ............. H05B 37/02
CN 107734760 A 2/2018
(Continued)

OTHER PUBLICATIONS

International Search Report of PCT Application No. PCT/CN2020/088249 dated Jul. 29, 2020 with English translation, (4p).

*Primary Examiner* — Dedei K Hammond
(74) *Attorney, Agent, or Firm* — Arch & Lake LLP

(57) ABSTRACT

A street lamp intelligent measurement and control device includes an MCU chip, and an electrical parameter measuring circuit, an NB-IoT communication circuit, a dimming circuit and a switching control circuit respectively connected to the MCU chip. The electrical parameter measuring circuit determines electrical parameter data and electrical energy data of a street lamp load, and transmits the electrical parameter data and the electrical energy data to the MCU chip. The MCU chip actively uploads the electrical parameter data and/or the electrical energy data to a remote control center according to a preset time interval, receives a controlling instruction from the remote control center, and sends out a switching signal and/or a dimming signal according to the controlling instruction. The switching control circuit (Continued)

controls an on-off of the street lamp load according to the switching signal sent by the MCU chip.

16 Claims, 3 Drawing Sheets

(51) Int. Cl.
*F21S 8/08* (2006.01)
*F21W 131/103* (2006.01)

(56) References Cited

FOREIGN PATENT DOCUMENTS

| | | |
|---|---|---|
| CN | 108184298 A | 6/2018 |
| CN | 108307571 A | 7/2018 |
| CN | 108366478 A | 8/2018 |
| CN | 208590142 U | 3/2019 |
| CN | 110099500 A | 8/2019 |

* cited by examiner

STREET LAMP INTELLIGENT MEASUREMENT AND CONTROL DEVICE BASED ON NB-IOT TECHNOLOGY

CROSS-REFERENCE TO RELATED APPLICATIONS

This application is based upon and claims the priority of PCT patent application No. PCT/CN2020/088249 filed on Apr. 30, 2020 which claims priority to Chinese patent application No. 201910380866.2 filed on May 8, 2019 and Chinese patent application No. 201920652961.9 filed on May 8, 2019, the entire contents of which are hereby incorporated by reference herein for all purposes.

TECHNICAL FIELD

The present disclosure relates to the field of measurement and control, and particularly to a street lamp intelligent measurement and control device based on NB-IoT technology.

BACKGROUND

With the expansion of urban lighting system, the traditional extensive roadway lighting management has gradually exposed its drawbacks. It neither can timely and accurately monitor the status of a lighting equipment and locate faults of the lighting equipment simply relying on human patrolling and time-control switching, nor can predict the faults in advance and reduce the power loss.

With the gradual deepening of the application of Internet of Things (IoT) technology in the field of roadway lighting monitoring, there are several disadvantages such as high cost, low base load, complex networking mode, unstable network, unstable transmission and short distance existed in conventional IoT technologies including GPRS, zigbee, power carrier and the like, which makes it increasingly unable to satisfy the demands of refined management of smart cities. The emerging IoT technologies such as loRa and SigFox involve problems that it's difficult to set up the equipment, a gateway is required to access the internet, the frequency band is unauthorized, etc., and hence are not suitable for lighting applications.

SUMMARY

In view of the above problems, the present disclosure is proposed to provide a street lamp intelligent measurement and control device based on NB-IoT technology, so as to overcome the above problems.

According to one aspect of the present disclosure, a street lamp intelligent measurement and control device based on NB-IoT technology is provided. The street lamp intelligent measurement and control device includes a microcontroller unit (MCU) chip, and an electrical parameter measuring circuit, an NB-IoT communication circuit, a dimming circuit and a switching control circuit respectively connected to the MCU chip; the electrical parameter measuring circuit with an output terminal connected to the MCU chip is configured to determine electrical parameter data and electrical energy data of a street lamp load, and transmit the electrical parameter data and the electrical energy data to the MCU chip; the MCU chip is signally connected to a remote control center through the NB-IoT communication circuit, actively uploads the electrical parameter data and/or the electrical energy data to the remote control center according to a preset time interval, and receives a controlling instruction from the remote control center; the MCU chip sends out a switching signal and/or a dimming signal according to the controlling instruction; the switching control circuit with an input terminal connected to the MCU chip is configured to control an on-off of the street lamp load according to the switching signal sent by the MCU chip; and the dimming circuit with an input terminal connected to the MCU chip is configured to adjust a light intensity of the street lamp load according to the dimming signal sent by the MCU chip.

The embodiment of the disclosure provides a street lamp intelligent measurement and control device based on NB-IoT technology. In this embodiment, the street lamp intelligent measurement and control device includes an MCU chip, and an electrical parameter measuring circuit, an NB-IoT communication circuit, a dimming circuit and a switching control circuit respectively connected to the MCU chip. The electrical parameter measuring circuit with an output terminal connected to the MCU chip is configured to determine electrical parameter data and electrical energy data of a street lamp load and transmit the electrical parameter data and the electrical energy data to the MCU chip. The MCU chip is signally connected to a remote control center through the NB-IoT communication circuit, actively uploads the electrical parameter data and/or the electrical energy data to the remote control center according to a preset time interval, and receives a controlling instruction from the remote control center. Then the MCU chip sends out a switching signal and/or a dimming signal according to the received controlling instruction. The switching control circuit with an input terminal connected to the MCU chip is configured to control an on-off of the street lamp load according to the switching signal sent by the MCU chip. The dimming circuit with an input terminal connected to the MCU chip is configured to adjust a light intensity of the street lamp load according to the dimming signal sent by the MCU chip.

The above and other objectives, advantages and features of the present disclosure will become more apparent to those skilled in the art from the following detailed description of specific embodiments of the present disclosure taken in conjunction with the accompanying drawings.

BRIEF DESCRIPTION OF THE DRAWINGS

By reading the detailed description of the preferred embodiments below, various other advantages and benefits will become clear to those of ordinary skill in the art. The drawings are only for the purpose of illustrating the preferred embodiments, and are not to be considered as any limitation to the present disclosure. Furthermore, throughout the drawings, the same reference symbols are used to denote the same components. In the drawings.

DETAILED DESCRIPTION

Figure 1:
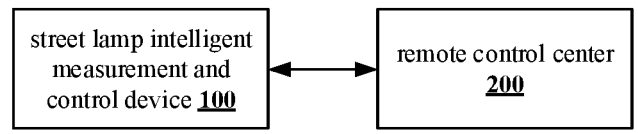
FIG. 1 is a schematic diagram illustrating a data interaction in a street lamp intelligent measurement and control device according to an embodiment of the present disclosure.

Exemplary embodiments of the present disclosure will be described in more detail below with reference to the accompanying drawings. Although exemplary embodiments of the present disclosure are illustrated in the drawings, it should be understood that the present disclosure may be embodied in various forms and should not be limited by the embodiments set forth herein. Instead, these embodiments are provided in order to understand the present disclosure more thoroughly and to fully convey the scope of the present disclosure to those skilled in the art.

It should be noted that the features in the embodiments and preferred embodiments of the present disclosure can be combined with each other on the premise of no conflict.

NB-IoT is built on a cellular network and only consumes a bandwidth of about 180 KHz. NB-IoT is an important branch of 5G communication in the application field of Internet of Things. NB-IoT has characteristics of large-scaled connection, wide coverage, low power consumption and low cost, and can better solve the problems of high density, wide distribution and high cost requirements of street lamp controlling areas.

Figure 2:
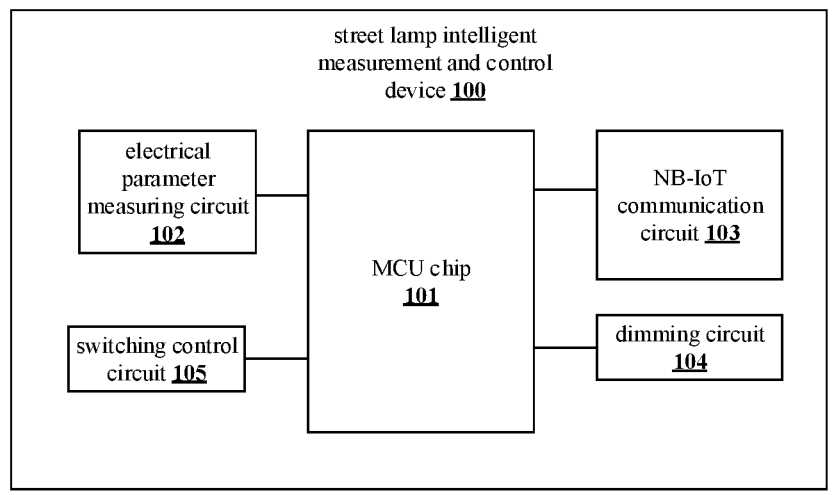
FIG. 2 is a schematic diagram of a street lamp intelligent measurement and control device based on NB-IoT technology according to an embodiment of the present disclosure.

FIG. 1 is a schematic diagram illustrating a data interaction of a street lamp intelligent measurement and control device according to an embodiment of the present disclosure. FIG. 2 is a schematic diagram of a street lamp intelligent measurement and control device 100 based on NB-IoT technology according to an embodiment of the present disclosure. As shown in FIG. 1 and FIG. 2, the street lamp intelligent measurement and control device 100 can, at least, include an MCU chip 101, and an electrical parameter measuring circuit 102, an NB-IoT communication circuit 103, a dimming circuit 104 and a switching control circuit 105 respectively connected to the MCU chip; the electrical parameter measuring circuit 102 with an output terminal connected to the MCU chip 101 is configured to determine electrical parameter data and electrical energy data of a street lamp load, and transmit the electrical parameter data and the electrical energy data to the MCU chip 101. The MCU chip 101 is signally connected to a remote control center 200 through the NB-IoT communication circuit 103, and actively uploads the electrical parameter data and/or the electrical energy data to the remote control center 200 according to a preset time interval. The MCU chip 101 can also receive a controlling instruction from the remote control center 200 through the NB-IoT communication circuit 103, and send out a switching signal and/or a dimming signal according to the received controlling instruction. The switching control circuit 105 with an input terminal connected to the MCU chip 101 is configured to control an on-off of the street lamp load according to the switching signal sent by the MCU chip 101. The dimming circuit 104 with an input terminal connected to the MCU chip 101 is configured to adjust a light intensity of the street lamp load according to the dimming signal sent by the MCU chip 101.

Electrical parameters of the street lamp load include, but are not limited to, a voltage, a current, a power and a power factor of the street lamp load line. The electrical energy data of the street lamp load can be obtained by performing integral operation on the power factor. The electrical parameter measuring circuit 102 has a built-in AD conversion module and a calculation module (not shown in the figures), in which the calculation module is configured to determine the voltage, the current, the power, the power factor and other electrical parameters that are actually applied to the street lamp load, and to perform integral operation on the electrical parameters of power to determine the electrical energy data of the street lamp load. The AD conversion module is configured to convert the electrical parameters and the electrical energy analog signals of the street lamp load into digital signals.

It should be noted that the street lamp load in the above embodiments can also be other lighting equipment loads, such as a guide rail lamp, a stage lamp, etc. The technical solution provided by the embodiment of the present disclosure can be used for any controller or power supply which adopts the NB-IoT communication mode.

Corresponding to the above NB-IoT communication circuit 103, an NB-IoT communication module and an NB-IoT dedicated SIM card chip (not shown in the figures) are built inside the NB-IoT communication circuit 103. The NB-IoT communication module can be connected to a nearby mobile base station, and hence be connected to the remote control center, thereby realizing a data interaction between the MCU chip 101 and the remote control center (receiving real-time data uploaded by the MCU chip 101 and sending out a controlling command).

Optionally, the dimming circuit 104 includes an analog switch, a triode, a mos tube and other devices, and at least one dimming mode is integrated in the dimming circuit 104. In a preferred embodiment of the present disclosure, the dimming circuit 104 is further configured to control a driving power supply of the street lamp load by using a PWM dimming mode and/or a 0-10V dimming mode, according to the dimming signal sent by the MCU chip 101. In this preferred embodiment, the driving power supply with the above dimming mode can be controlled to realize the dimming control. For example, an LED light source is used as a street lamp load, and the dimming modes include a PWM dimming mode and 0-10V dimming mode. The technical solution of this preferred embodiment can be utilized to control the dimming of the LED light source with one of these two dimming modes, and the specific dimming mode can be set and selected through an I/O interface of the MCU chip 101.

Optionally, the switching control circuit 105 includes a relay. The switching control circuit 105 can control an on-off of a firing wire at an input terminal of an external driving power supply through the relay, so as to achieve the purpose of switching on and off the lamp.

When the above-mentioned street lamp intelligent measurement and control device based on NB-IoT technology is adopted, there may be the case where one or more street lamps run abnormally or fail, which, however, is not found out timely by the operator and can't be predicted in advance. This is not convenient for maintenance and emergency repair of the street lamp. In view of this situation, in a preferred embodiment of the present disclosure, the MCU chip 101 is also configured to determine that the electrical parameter data of the street lamp load exceeds a preset alarm threshold, and send an alarm signal to the remote control center through the NB-IoT communication circuit 103. According to the technical solution provided in the preferred embodiment, the electrical parameter data of the street lamp load will be compared with the preset alarm threshold, and when the electrical parameter data of the street lamp load exceeds the preset alarm threshold, an alarm signal will be sent to the remote control center through the NB-IoT communication circuit, which is convenient for early fault prediction and timely fault finding. The technical solution provided on the basis of this preferred embodiment can not only predict street lamp failures in advance, but also notify the relevant operator in time when the street lamp is abnormal or faulty, so that data recovery or fault maintenance can be carried out in time, and maintenance efficiency can be further improved.

Figure 3:
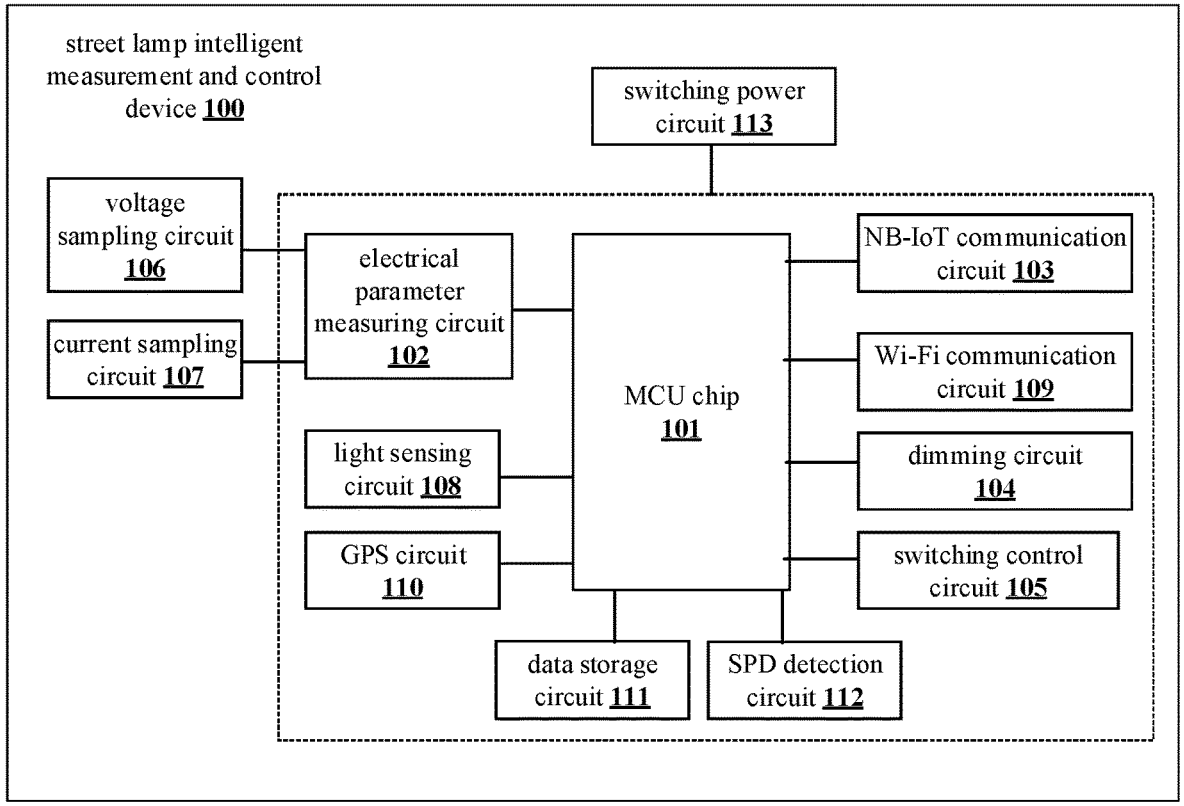
FIG. 3 is a schematic diagram of a street lamp intelligent measurement and control device based on NB-IoT technology according to a preferred embodiment of the present disclosure.

FIG. 3 is a street lamp intelligent measurement and control device based on NB-IoT technology according to a preferred embodiment of the present disclosure. As shown in FIG. 3, the street lamp intelligent measurement and control device 100 may also include a voltage sampling circuit 106 and/or a current sampling circuit 107, which can sample a load power line and supply the electrical parameter measuring circuit 102 with a signal to be measured.

The voltage sampling circuit 106, with an input terminal connected to the load power line and an output terminal connected to the electrical parameter measuring circuit 102, is configured to obtain a mains voltage signal of the load power line, convert the mains voltage signal into a first small signal, and transmit the first small signal to the electrical parameter measuring circuit 102.

The current sampling circuit 107, with an input terminal connected to the load power line and an output terminal connected to the electrical parameter measuring circuit 102, is configured to obtain a current signal of the load power line of the power supply line, convert the current signal into a second small signal, and transmit the second small signal to the electrical parameter measuring circuit 102.

The electrical parameter measuring circuit 102 is also configured to determine the electrical parameter data and the electrical energy data of the street lamp load according to the first small signal and/or the second small signal.

The main function of the voltage sampling circuit 106 is to sample a voltage of the load power line. According to different circuit parameters, the voltage sampling circuit 106 can be directly connected to the power supply line by adding resistor(s) externally or internally, so as to convert the mains voltage signal into the first small signal. For example, the voltage sampling circuit has a built-in resistor, and the voltage sampling circuit can perform a voltage division to the external mains voltage of 220V through the built-in resistor, so as to convert the external mains voltage into a small voltage signal of 50 mV, and then transmit the small voltage signal to the electrical parameter measuring circuit for subsequent processing.

The main function of the current sampling circuit 107 is to sample the current of the load power line, and then obtain a current sampling signal. According to different circuits, the current sampling circuit 107 can be externally or internally provided with a current transformer and a sampling resistor, so as to convert a load current signal into a second small signal. For example, the current sampling circuit has a built-in current transformer and a built-in sampling resistor. The current sampling circuit can convert the current sampling signal of 0~5 A into a small voltage sampling signal of 0~50 mV through an internal current transformer of 5 A/5 mA and a sampling resistor, and then transmit the small voltage sampling signal to the electrical parameter measuring circuit for subsequent processing.

It should be noted that the above-mentioned examples are merely for the purpose of better illustrating the technical solution of the present disclosure, without limiting the present disclosure thereto.

Referring to FIG. 2, in a preferred embodiment of the present disclosure, the MCU chip 101 can also be configured to send a switching signal to the switching control circuit and/or send a dimming signal to the dimming circuit, according to a predetermined time period based on a time-control switching-dimming strategy. In this preferred embodiment, the switching control and/or dimming control will be carried out according to the predetermined time period, so as to realize the time-control switching-dimming strategy.

In this embodiment, the time-control switching-dimming strategy at least includes one of the following: a date mode, configured to be a strategy of controlling the switching and dimming according to a time period cycled by year, month and day; a week mode, configured to be a strategy of controlling the switching and dimming according to a time period cycled by week; and an astronomical mode, configured to be a strategy of controlling the switching and dimming according to a sunrise-sunset time period determined based on the longitude and latitude.

For example, it controls switching and dimming according to a time period set from year xx, month xx, day xx to year xx, month xx, day xx, that is, a strategy of controlling the switching and dimming according to a time period which is configured by setting year, month and data, so as to realize the switching-dimming strategy in the date mode. For another example, it controls switching and dimming according to a time period set from this Sunday to next Monday, that is, a strategy to perform switching and dimming in cycle by week, so as to realize the switching-dimming strategy in the week mode. For yet another example, it controls switching and dimming by determining a sunrise-sunset time period in conjunction with the latitude and longitude information of the local area, so as to realize the switching-dimming strategy in the astronomical mode, that is, the on-off and dimming of the street lamp is automatically controlled according to the sunrise time and/or the sunset time, for example, it can control to turn off the street lamp load in a time period from the sunrise time to the sunset time (daytime), and to turn on the street lamp load in other time periods. By setting different time periods and different dimming modes, it can effectively reduce the loss of lighting power, lower the cost of electricity, and achieve the purpose of energy saving and emission reduction.

Optionally, the switching-dimming strategy also includes a real-time switching-dimming strategy, and a switching-dimming strategy of combining light control with time control. The switching-dimming strategy of combining light control with time control not only has the characteristics of a time-control switching-dimming strategy, but also has the characteristics of automatically recognizing a light irradiation status by a photosensitive circuit to judge whether to execute a switching-dimming operation. The real-time switching-dimming strategy can control switching and dimming of the device in real time through a NB-IoT communication circuit or a Wi-Fi antenna circuit. It should be noted that the switching-dimming strategy may be adjusted at any time according to different requirements and application scenarios.

Usually, the light irradiations required by a dark status and a brightness status are different. Even in the same brightness status or dark status, the light irradiations required for sunny and cloudy days, and the light irradiations required in case of moonlight and no moonlight may also be different. Given that the sunrise time and sunset time as determined according to the longitude and latitude of a current position is 6:00 and 17:00, respectively, and that the time-control switching-dimming strategy in the astronomical mode is adopted, when the street lamp is set to be turned off during the time period from 6:00 to 17:00, the street lamp should always be in an off status during the time period from 6:00 to 17:00 under this switching-dimming strategy. However, in practical application, due to the influence of weather such as cloudy day or rainy day, the light intensity in a certain time period within the time period from 6:00 to 17:00 may be reduced as compared with that in normal weather, so it is necessary to turn on the lamp in time to provide a better lighting environment. In view of this situation, only using the time-control switching-dimming strategy cannot well satisfy the lighting demands. In a preferred embodiment of the present disclosure, as shown in FIG. 3, the street lamp intelligent measurement and control device 100 may also include a light sensing circuit 108, and the light sensing circuit 108 with an output terminal connected to the MCU chip 101 is configured to acquire an external light intensity signal and transmit the light intensity signal to the MCU chip 101. Furthermore, the MCU chip 101 may also be configured to send a switching signal to the switching control circuit and/or send a dimming signal to the dimming circuit, according to a predetermined time period in combination with the current light intensity signal, based on the switching-dimming strategy of combining light control with time control. In this preferred embodiment, the switching control and/or dimming control can be carried out by combining the time-control switching-dimming strategy with the actual, current external light intensity, so that the switching-dimming strategy of combining light control with time control is realized, and the street lamp control is more intelligent. Moreover, the street lamp is controlled in combination with the current and actual light intensity, so that the power loss of lighting can be further reduced.

The main function of the light sensing circuit 108 is to acquire an external light intensity signal. Optionally, the light sensing circuit 108 includes a phototransistor (not shown in the figures), then the external light intensity signal is acquired through the phototransistor.

Corresponding to the MCU chip 101 in the above embodiment, it may also internally include an AD converter (not shown in the figures), which is configured to convert the external light intensity signal as acquired into a digital signal. The MCU chip 101 performs corresponding calibration and calculation according to the converted, light intensity value signal so as to obtain an actual, external light intensity value, and then compares the actual, external light intensity value with a preset dark light intensity threshold and a preset brightness light intensity threshold, respectively, to determine whether the current status is the dark status or the brightness status, so as to control the on-off and/or the dimming of the street lamp load according to the determined, dark or brightness status.

In the dark status and the brightness status, the embodiment of the present disclosure provides a plurality of optional implementations. In an optional embodiment of the present disclosure, if the actual, external light intensity value is not greater than the preset dark light intensity threshold, it is determined that it is currently in the dark status; if the actual, external light intensity value is not less than the preset brightness light intensity threshold, it is determined that it is currently in the brightness status. The embodiment of the present disclosure can determine the current dark or brightness status, so that relevant circuit modules can perform switching and/or dimming according to the actual, current light intensity.

The conditions for determining whether it's the dark status or the brightness status can be reasonably set according to actual situations, which is not limited by the present disclosure.

Figure 4:
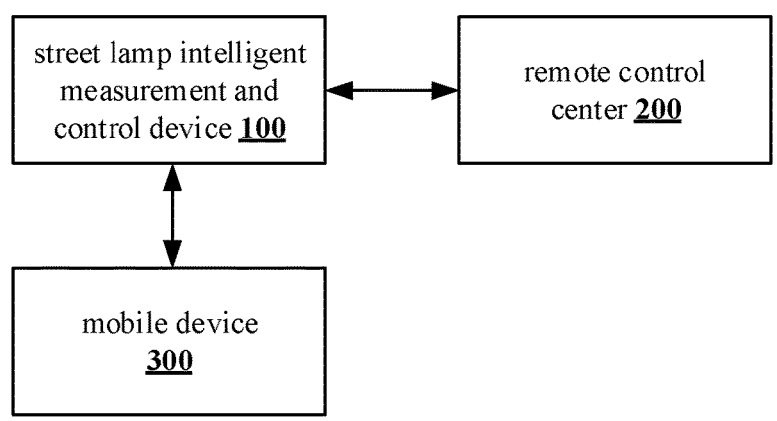
FIG. 4 is a schematic diagram illustrating a data interaction of a street lamp intelligent measurement and control device according to a preferred embodiment of the present disclosure.

FIG. 4 is a schematic diagram illustrating a data interaction of a street lamp intelligent measurement and control device according to a preferred embodiment of the present disclosure. In a preferred embodiment of the present disclosure, referring to FIGS. 3 and 4, the street lamp intelligent measurement and control device 100 may also include a Wi-Fi communication circuit 109 connected to the MCU chip 101. The MCU chip 101 is signally connected to an external mobile device 300 through the Wi-Fi communication circuit 109, and receives a debugging command from the external mobile device 300 and/or a controlling command from the external mobile device 300, so that the MCU chip 101 can debug the street lamp intelligent measurement and control device 100 according to the debugging command; and/or, the MCU chip 101 sends a switching signal to the switching control circuit 105 and/or sends a dimming signal to the dimming circuit 104 according to the controlling command received in real time, based on the real-time switching-dimming strategy, thereby realizing switching and dimming control.

In this preferred embodiment, the MCU chip 101 also internally includes a Wi-Fi driving circuit and a corresponding Wi-Fi protocol stack (not shown in the figures), then the MCU chip 101 can be signally connected to an external device through the Wi-Fi communication circuit 109. In this embodiment, the Wi-Fi communication circuit 109 can be used for local data reading, configuration maintenance and group operation, and can also be used for switching and dimming control of the lamp under a special circumstance. Based on the technical solution provided by this embodiment, a mobile device can be supported for local device debugging, running status query and group control, which is convenient for on-site construction and management.

The mobile device may be a mobile communication device such as a mobile phone and a PAD, which is not limited by the present disclosure.

In a preferred embodiment of the present disclosure, as shown in FIG. 3, the street lamp intelligent measurement and control device 100 may also include a GPS positioning circuit 110, and the GPS positioning circuit with an output terminal connected to the MCU chip 101 is configured to transmit current position information of the street lamp intelligent measurement and control device 100 to the MCU chip 101. Furthermore, the MCU chip 101 can also be configured to read the position information and upload the position information to the remote control center through the NB-IoT communication circuit 103.

The main function of the GPS positioning circuit 110 is to position the street lamp, and a GPS receiving module (not shown in the figures) can be installed in the GPS positioning circuit 110, so that the GPS positioning circuit 110 can obtain satellite positioning information through the GPS receiving module to obtain the actual longitude and latitude information where the GPS receiving module is currently located. The longitude and latitude information is the actual position information of the street lamp, and is transmitted to the MCU chip 101, and then the position information is uploaded to the remote control center through the NB-IoT communication circuit 103.

The technical solution based on this preferred embodiment can facilitate the operating organization to manage assets, accurately and quickly locate faults, and then quickly repair the faults.

In a preferred embodiment of the present disclosure, as shown in FIG. 3, the street lamp intelligent measurement and control device 100 may also include a data storage circuit 111, the data storage circuit 111 with an input terminal connected to the MCU chip 101 is configured to store configuration information and an operation log of the street lamp intelligent measurement and control device 100. The MCU chip 101 is also configured to control the data storage circuit 111 to store, read and erase.

The data storage circuit 111 includes a large-capacity FLASH memory, which stores various configuration parameters, calibration parameters, control strategies and operation log information.

In a preferred embodiment of the present disclosure, as shown in FIG. 3, the street lamp intelligent measurement and control device 100 also includes an SPD detection circuit 112, which is configured to detect a status indication signal of an SPD integrated in the street lamp and provide the signal to the MCU chip 101.

Optionally, the SPD detection circuit 112 is a switch value detection circuit with optocoupler isolation, the switch value detection circuit detects a signal at a failure indication port of the SPD inside the lamp, and sends an alarm command to a master computer by actively uploading the alarm command when the SPD fails, thereby reminding relevant operator(s) to replace the SPD.

In a preferred embodiment of the present disclosure, as shown in FIG. 3, the street lamp intelligent measurement and control device 100 may also include a switching power circuit 113, and the switching power circuit 113 with an input terminal connected to the mains supply is configured to convert the inputted, mains electricity into a constant low-voltage direct (DC) current, so as to supply the street lamp intelligent measurement and control device 100 with DC power. The low-voltage DC voltage outputted by the switching power circuit 113 is mainly used for powering other internal modules. In FIG. 3, the connection relationships between the switching power circuit 113 and other circuit modules are not exhaustively enumerated.

Figure 5:
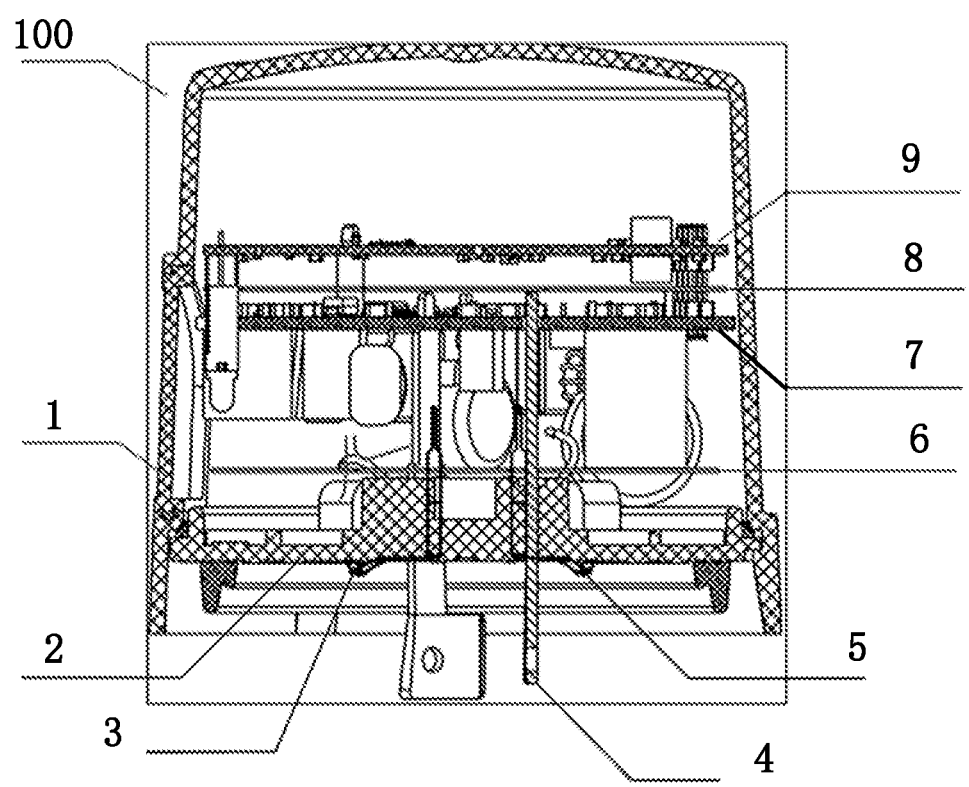
FIG. 5 is a schematic diagram illustrating a cross-sectional structure of a street lamp intelligent measurement and control device according to an embodiment of the present disclosure.

FIG. 5 is a schematic diagram illustrating a cross-sectional structure of a street lamp intelligent measurement and control device according to an embodiment of the present disclosure. As shown in FIG. 5, the street lamp intelligent measurement and control device 100 includes an upper cover 1, a base 2, a power sampling device 7 and a control device 9; the upper cover 1 and the base 2 are shell parts of the street lamp intelligent measurement and control device 100, and are assembled to form an internal space of the street lamp intelligent measurement and control device 100; then the power sampling device 7 and the control device 9 are arranged in the internal space; further, the voltage sampling circuit 106, the current sampling circuit 107 and the switching control circuit are arranged on the power sampling device 7; the MCU chip 101, the electrical parameter measuring circuit 102, the NB-IoT communication circuit 103 and the dimming circuit 104 are arranged on the control device 9; the power sampling device 7 is electrically connected to the control device 9.

In an optional embodiment of the present disclosure, the power sampling device 7 and the control device 9 are respectively provided with an electrical connector, and the electrical connector of the power sampling device and the electrical connector of the control device are electrically connected with each other in a plugging-in manner. Preferably, the power sampling device 7 is connected to the control device 9 through a pin header.

Optionally, the upper cover 1 and the base 2 are connected by a buckle, and the buckle is arranged on the upper cover 1 and/or the base 2.

Optionally, the power sampling device 7 is also provided with a functional module circuit such as a light sensing circuit 108 and/or a switching power circuit 113.

Optionally, the control device 9 is also provided with a functional module circuit such as a Wi-Fi antenna circuit 109, a GPS positioning circuit 110, a data storage circuit 111, and/or an SPD detection circuit 112.

In a preferred embodiment of the present disclosure, as shown in FIG. 5, the base 2 is provided with a dimming interface 3, the dimming interface 3 can be used for connecting the driving power supply of the street lamp load, and the dimming interface 3 is connected to the dimming circuit 104 on the control device 9 through a wire. In this preferred embodiment, the dimming interface 3 is used as a physical interface of the street lamp intelligent measurement and control device 100 for dimming output. Based on this preferred embodiment, the dimming circuit on the control device can output a dimming signal to an external street lamp load through the dimming interface, thereby realizing the dimming control of the external street lamp load.

When the control device 9 is provided with the SPD detection circuit 112, the base 2 is also provided with an SPD detection interface 5 which can be used for connecting a street lamp load, and the SPD detection interface 5 is connected to the SPD detection circuit 112 on the control device 9 through a wire. In this preferred embodiment, the SPD detection interface 5 is used as a physical interface for inputting SPD status of the street lamp intelligent measurement and control device 100. Based on this preferred embodiment, the signal at the failure indication port of the SPD inside the street lamp load can be detected; and when the SPD fails, an alarm command is sent to the master computer by actively uploading the command, so as to remind relevant operator(s) to replace the SPD, thereby ensuring the safety.

Referring to FIG. 5, the base 2 is also provided with a plurality of copper pins 4. Optionally, the plurality of copper pins 4 include three copper pins. Two among these three copper pins are connected to the firing wire respectively, so as to realize the input of the firing wire and the output of the firing wire, while the other copper pin is connected to a zero wire. Furthermore, the plurality of copper pins 4 each are in a long-strip shape and extend from the base 2 to the power sampling device 7. In this embodiment, the two copper pins connected to the firing wire are used as a power supply interface and a switching control interface, respectively.

In a preferred embodiment of the present disclosure, as shown in FIG. 5, the base 2, the power sampling device 7 and the control device 9 are arranged from bottom to top in the internal space, and a Mylar (6 and 8 shown in FIG. 5) is arranged between every two of the base 2, the power sampling device 7 and the control device 9, so as to realize safety isolation.

According to the technical solution provided by the embodiment of the present disclosure, the real-time monitoring of the street lamp load can be realized, a cross-line alarm can be sent out, and a fault can be recorded and uploaded. The remote control center can control the running status of each street lamp in real time, and can analyze the energy consumption thereof, so as to achieve the purpose of refined power utilization. When controlling the street lamp load, a variety of switching-dimming strategies can be realized. By setting different switching-dimming strategies, the power loss of lighting can be effectively reduced, the electricity expenditure can be lowered, and the purpose of energy saving and emission reduction can be achieved.

In the specification provided herein, plenty of specific details are explained. However, it can be understood that embodiments of the present disclosure may be practiced without these specific details. In some instances, well-known methods, structures and techniques are not shown in details in order not to obscure the understanding of this specification.

Similarly, it should be understood that in the above description of exemplary embodiments of the present disclosure, various features of the present disclosure are sometimes grouped together into a single embodiment, figure, or description thereof, in order to simplify the present disclosure and facilitate understanding one or more of various inventive aspects. However, the disclosed method should not be interpreted as reflecting the intention that the claimed disclosure requires more features than those explicitly recited in each claim. More precisely, as reflected in the following claims, the inventive aspect lies in less than all the features of the single embodiment disclosed above. Therefore, the claims following the detailed description are hereby expressly incorporated into the detailed description, with each claim itself serving as a separate embodiment of the present disclosure.

Those skilled in the art can understand that the modules of the device in one embodiment can be adaptively changed and set in one or more devices different from the embodiment. The modules or units or components in the embodiments may be combined into one module or unit or component, and additionally they may be divided into a plurality of sub-modules or sub-units or sub-components. Except that at least some of such features and/or processes or units are mutually exclusive, all the features disclosed in this specification (including accompanying claims, abstract and drawings) and all the processes or units of any method or equipment so disclosed can be combined in any combination. Unless explicitly stated otherwise, each feature disclosed in this specification (including accompanying claims, abstract and drawings) may be replaced by alternative features that provide the same, equivalent or similar purpose.

Optionally, the street lamp intelligent measurement and control device further includes a voltage sampling circuit and/or a current sampling circuit; the voltage sampling circuit, with an input terminal connected to a power supply line and an output terminal connected to the electrical parameter measuring circuit, is configured to obtain a mains voltage signal of the power supply line, convert the mains voltage signal into a first small signal and transmit the first small signal to the electrical parameter measuring circuit; the current sampling circuit, with an input terminal connected to the power supply line and an output terminal connected to the electrical parameter measuring circuit, is configured to obtain a load current signal of the power supply line, convert the load current signal into a second small signal, and transmit the second small signal to the electrical parameter measuring circuit; and the electrical parameter measuring circuit is further configured to determine the electrical parameter data and the electrical energy data of the street lamp load according to the first small signal and/or the second small signal.

Optionally, the MCU chip is further configured to determine that the electrical parameter data of the street lamp load exceeds a preset alarm threshold value, and send an alarm signal to the remote control center through the NB-IoT communication circuit.

Optionally, the MCU chip is further configured to send a switching signal to the switching control circuit and/or send a dimming signal to the dimming circuit, according to a predetermined time period based on a time-control switching-dimming strategy; the time-control switching-dimming strategy at least includes one of the following: a date mode, configured to be a strategy of controlling the switching and dimming according to a time period cycled by year, month and day; a week mode, configured to be a strategy of controlling the switching and dimming according to a time period cycled by week; and an astronomical mode, configured to be a strategy of controlling the switching and dimming according to a sunrise-sunset time period determined based on the longitude and latitude.

Optionally, the street lamp intelligent measurement and control device further includes a light sensing circuit, and the light sensing circuit with an output terminal connected to the MCU chip is configured to acquire an external light intensity signal and transmit the light intensity signal to the MCU chip, and the MCU chip is further configured to send a switching signal to the switching control circuit and/or send a dimming signal to the dimming circuit according to a predetermined time period in combination with a current light intensity signal based on a switching-dimming strategy of combining light control with time control.

Optionally, the street lamp intelligent measurement and control device further includes a Wi-Fi communication circuit connected to the MCU chip, the MCU chip is signally connected to an external mobile device through the Wi-Fi communication circuit and receives a debugging command and/or a controlling command from the external mobile device; and the MCU chip is further configured to debug the street lamp intelligent measurement and control device according to the debugging command; and/or, the MCU chip is further configured to send a switching signal to the switching control circuit and/or send a dimming signal to the dimming circuit according to the controlling command received in real time based on a real-time switching-dimming strategy.

Optionally, the street lamp intelligent measurement and control device further includes a GPS positioning circuit, and the GPS positioning circuit with an output terminal connected to the MCU chip is configured to transmit current position information of the street lamp intelligent measurement and control device to the MCU chip; and the MCU chip is further configured to read the position information and upload the position information to the remote control center through the NB-IoT communication circuit.

Optionally, the street lamp intelligent measurement and control device further includes a data storage circuit, and the data storage circuit with an input terminal connected to the MCU chip is configured to store configuration information and an operation log of the street lamp intelligent measurement and control device; and the MCU chip is further configured to control the data storage circuit to store, read and erase.

Optionally, the street lamp intelligent measurement and control device further includes an SPD detection circuit configured to detect a status indication signal of an SPD integrated inside the street lamp and provide the signal to the MCU chip.

Optionally, the street lamp intelligent measurement and control device further includes a switching power circuit, and the switching power circuit with an input terminal connected to a mains supply is configured to convert inputted mains electricity into a constant low-voltage direct current (DC), so as to supply the street lamp intelligent measurement and control device with DC electricity.

Optionally, the dimming circuit is further configured to control a driving power supply of the street lamp load by using a PWM dimming mode and/or a 0-10V dimming mode, according to the dimming signal sent by the MCU chip.

Optionally, the street lamp intelligent measurement and control device includes an upper cover, a base, a power sampling device and a control device; the upper cover and the base are shell parts of the street lamp intelligent measurement and control device, and the upper cover and the base are assembled to form an internal space of the street lamp intelligent measurement and control device; the power sampling device and the control device are arranged in the internal space; and the voltage sampling circuit, the current sampling circuit and the switching control circuit are arranged on the power sampling device; the MCU chip, the electrical parameter measuring circuit, the NB-IoT communication circuit and the dimming circuit are arranged on the control device; and the power sampling device is electrically connected to the control device.

Optionally, the power sampling device and the control device are respectively provided with an electrical connector, and the electrical connector of the power sampling device and the electrical connector of the control device are electrically connected with each other in a plugging-in manner.

Optionally, the base is provided with a dimming interface, the dimming interface is configured to connect the driving power supply of the street lamp load, and the dimming interface is connected to the dimming circuit on the control device through a wire.

Optionally, the base, the power sampling device and the control device are arranged from bottom to top in the internal space, and a Mylar is arranged between every two of the base, the power sampling device and the control device, so as to realize safety isolation.

According to the technical solution provided by the embodiment of the present disclosure, the electrical parameter data and the electrical energy data of the street lamp load are obtained through the electrical parameter measuring circuit and the MCU chip, and then the obtained data of the street lamp load is uploaded to the remote control center through the NB-IoT communication circuit, so as to realize real-time monitoring of the street lamp load. In addition, the remote control center can also send a controlling instruction to the MCU in the MCU chip, so that the MCU chip can switch and/or dim the street lamp load according to the instruction of the remote control center. According to the technical solution provided by the embodiment of the present disclosure, the electrical parameter data and the electrical energy data of the street lamp load can be monitored in real time, the real-time data of the street lamp load can be obtained and uploaded to the remote control center, and the remote control center can control the running state of each street lamp in real time and carry out energy consumption analysis thereof, thereby achieving the purpose of refined power utilization. Furthermore, when the technical solution provided by the embodiment of the present disclosure is applied to control the street lamp load, various switching and dimming strategies can be realized. With the configuration of different switching and dimming strategies, the loss of lighting power can be effectively reduced, the electricity expenditure can be lowered, and the purposes of energy conservation and emission reduction can be achieved.

The above description is merely an overview of the technical solution of the present disclosure, which can be implemented according to the contents of the specification in order to understand the technical means of the present disclosure more clearly.

In addition, it can be understood by those skilled in the art that although some embodiments described herein include some features instead of other features included in other embodiments, the combination of features of different embodiments is meant to be within the scope of the present disclosure and forms different embodiments. For example, in the claims, any one of the claimed embodiments can be used in any combination.

It should be noted that the above embodiments illustrate the present disclosure rather than limiting the present disclosure thereto, and those skilled in the art can design alternative embodiments without departing from the scope of the appended claims. In the claims, any reference symbols between brackets should not be construed as limitations of the claims. The terms "comprise," "comprising," "include," "including," etc., do not exclude the presence of elements or steps not listed in the claims. The term "a" or "an" preceding an element does not exclude the presence of a plurality of such elements. The present disclosure can be implemented by means of hardware comprising several different elements and by means of a suitably programmed computer. In the unit claim enumerating a plurality of devices, several of these devices can be embodied by the same hardware item. The use of the words first, second, and third does not indicate any order. These words can be interpreted as names.

So far, it should be recognized by those skilled in the art that although many exemplary embodiments of the present disclosure have been shown and described in detail herein, many other variations or modifications in accordance with the principles of the present disclosure can still be directly determined or deduced according to the disclosure of the present disclosure without departing from the spirit and scope of the present disclosure. Therefore, the scope of the present disclosure should be understood and deemed to cover all such other variations or modifications.

What is claimed is:

1. A street lamp intelligent measurement and control device, comprising:
   a microcontroller unit (MCU) chip;
   a voltage sampling circuit;
   a current sampling circuit;
   a power sampling device and a control device; and
   an electrical parameter measuring circuit, an NB-IoT communication circuit, a dimming circuit, and a switching control circuit respectively connected to the MCU chip,
   wherein the electrical parameter measuring circuit with an output terminal connected to the MCU chip is configured to determine electrical parameter data and electrical energy data of a street lamp load, and transmit the electrical parameter data and the electrical energy data to the MCU chip;
   wherein the MCU chip is signally connected to a remote control center through the NB-IoT communication circuit, actively uploads the electrical parameter data and/or the electrical energy data to the remote control center according to a preset time interval, and receives a controlling instruction from the remote control center;

the MCU chip sends out a switching signal and/or a dimming signal according to the controlling instruction;

wherein the switching control circuit comprises a switching input terminal connected to the MCU chip, the switching control circuit is configured to control an on-off of the street lamp load according to the switching signal sent by the MCU chip;

wherein the dimming circuit comprises an input terminal connected to the MCU chip, the dimming circuit is configured to adjust a light intensity of the street lamp load according to the dimming signal sent by the MCU chip; and wherein the voltage sampling circuit, the current sampling circuit and the switching control circuit are arranged on the power sampling device; the MCU chip, the electrical parameter measuring circuit, the NB-IoT communication circuit and the dimming circuit are arranged on the control device; and the power sampling device is electrically connected to the control device.

2. The street lamp intelligent measurement and control device according to claim 1, wherein the voltage sampling circuit, with an input terminal connected to a power supply line and an output terminal connected to the electrical parameter measuring circuit, is configured to obtain a mains voltage signal of the power supply line, convert the mains voltage signal into a first signal and transmit the first signal to the electrical parameter measuring circuit;

the electrical parameter measuring circuit is further configured to determine the electrical parameter data and the electrical energy data of the street lamp load according to the first signal.

3. The street lamp intelligent measurement and control device according to claim 2, wherein the current sampling circuit, with an input terminal connected to the power supply line and an output terminal connected to the electrical parameter measuring circuit, is configured to obtain a load current signal of the power supply line, convert the load current signal into a second signal, and transmit the second signal to the electrical parameter measuring circuit; and wherein the electrical parameter measuring circuit is further configured to determine the electrical parameter data and the electrical energy data of the street lamp load according to the first signal and/or the second signal.

4. The street lamp intelligent measurement and control device according to claim 3, further comprising an upper cover and a base, wherein the upper cover and the base are shell parts of the street lamp intelligent measurement and control device, and the upper cover and the base are assembled to form an internal space of the street lamp intelligent measurement and control device; and wherein the power sampling device and the control device are arranged in the internal space.

5. The street lamp intelligent measurement and control device according to claim 4, wherein the power sampling device and the control device are respectively provided with an electrical connector, and the electrical connector of the power sampling device and the electrical connector of the control device are electrically connected with each other in a plugging-in manner.

6. The street lamp intelligent measurement and control device according to claim 4, wherein the base is provided with a dimming interface, the dimming interface is configured to connect a driving power supply of the street lamp load, and the dimming interface is connected to the dimming circuit on the control device through a wire.

7. The street lamp intelligent measurement and control device according to claim 4, wherein the base, the power sampling device, and the control device are arranged from bottom to top in the internal space, and biaxially-oriented polyethylene terephthalate arranged between the base and the power sampling device and between the power sampling device and the control device, for safety purposes.

8. The street lamp intelligent measurement and control device according to claim 1, wherein the MCU chip is further configured to determine that the electrical parameter data of the street lamp load exceeds a preset alarm threshold, and send an alarm signal to the remote control center through the NB-IoT communication circuit.

9. The street lamp intelligent measurement and control device according to claim 1, wherein the MCU chip is further configured to send a switching signal to the switching control circuit and/or send a dimming signal to the dimming circuit, according to a predetermined time period, based on a time-control switching-dimming strategy; wherein the time-control switching-dimming strategy at least comprises one of the following:

a date mode, configured to be a strategy of controlling the switching and dimming according to a time period cycled by year, month and day;

a week mode, configured to be a strategy of controlling the switching and dimming according to a time period cycled by week; and an astronomical mode, configured to be a strategy of controlling the switching and dimming according to a sunrise-sunset time period determined based on the longitude and latitude.

10. The street lamp intelligent measurement and control device according to claim 1, further comprising a light sensing circuit, and the light sensing circuit with an output terminal connected to the MCU chip is configured to acquire an external light intensity signal and transmit the light intensity signal to the MCU chip, and the MCU chip is further configured to send a switching signal to the switching control circuit and/or send a dimming signal to the dimming circuit, according to a predetermined time period in combination with a current light intensity signal based on a switching-dimming strategy of combining light control with time control.

11. The street lamp intelligent measurement and control device according to claim 1, further comprising a Wi-Fi communication circuit connected to the MCU chip, the MCU chip is signally connected to an external mobile device through the Wi-Fi communication circuit and receives a debugging command and/or a controlling command from the external mobile device; and the MCU chip is further configured to debug the street lamp intelligent measurement and control device according to the debugging command; and/or, the MCU chip is further configured to send a switching signal to the switching control circuit and/or send a dimming signal to the dimming circuit, according to the controlling command received in real time based on a real-time switching-dimming strategy.

12. The street lamp intelligent measurement and control device according to claim 1, further comprising a GPS positioning circuit, and the GPS positioning circuit with an output terminal connected to the MCU chip is configured to transmit current position information of the street lamp intelligent measurement and control device to the MCU chip; and the MCU chip is further configured to read the position information and upload the position information to the remote control center through the NB-IoT communication circuit.

13. The street lamp intelligent measurement and control device according to claim 1, further comprising a data storage circuit, and the data storage circuit with an input terminal connected to the MCU chip is configured to store configuration information and an operation log of the street lamp intelligent measurement and control device; and the MCU chip is further configured to control the data storage circuit to store, read and erase.

14. The street lamp intelligent measurement and control device according to claim 1, further comprising an SPD detection circuit configured to detect a status indication signal of an SPD integrated inside the street lamp and provide the status indication signal to the MCU chip.

15. The street lamp intelligent measurement and control device according to claim 1, further comprising a switching power circuit, and the switching power circuit with an input terminal connected to a mains supply is configured to convert inputted mains electricity into a constant low-voltage direct current (DC) to supply the street lamp intelligent measurement and control device with DC electricity.

16. The street lamp intelligent measurement and control device according to claim 1, wherein the dimming circuit is further configured to control a driving power supply of the street lamp load by using a PWM dimming mode and/or a 0-10 V dimming mode, according to the dimming signal sent by the MCU chip.

* * * * *